United States Patent Office 3,700,546
Patented Oct. 24, 1972

3,700,546
HIGH IMPACT WEATHERABLE RIGIDIFIED STRUCTURES
Joseph Francis Terenzi, Ridgefield, Conn., assignor to American Cyanamid Company, Stamford, Conn.
No Drawing. Filed Feb. 17, 1971, Ser. No. 116,242
Int. Cl. B32b 17/06
U.S. Cl. 161—195                                10 Claims

ABSTRACT OF THE DISCLOSURE

A high impact thermoplastic sheet having at least one surface thereof reinforced with a fiberglass and polyester resin composition and a method for the production thereof, are disclosed.

BACKGROUND OF THE INVENTION

Unsaturated polyester resin compositions have been known for a plurality of years. These polyester resins are generally prepared by reacting an $\alpha,\beta$-ethylenically unsaturated dicarboxylic acid and a polyhydric alcohol, preferably a glycol with or without a dicarboxylic acid free of non-benzenoid unsaturation. The resultant unsaturated polyester resins are generally admixed with a cross-linking agent which is in the nature of a polymerizable monomer containing a $CH_2{=}C{<}$ group and having a boiling point of at least about 60° C. The ultimate polyester resins can be used for laminating purposes, particularly when used in combination with a thermoformable or thermoformed comparatively rigid thermoplastic sheet. The plastic sheet is generally made from a methyl methacrylate polymer such as poly(methyl methacrylate). The polyester resins are applied to these thermoformed or thermoformable plastic sheets along with a filler such as glass fibers, in order to impart rigidity and strength to the ultimate object.

FIELD OF THE INVENTION

The present invention is in the field of laminates prepared from a thermoplastic sheet that has been thermoformed to the desired shape and which has been rigidized by having applied thereto an unsaturated polyester resin composition containing glass fibers.

DESCRIPTION OF THE PRIOR ART

The most representative references relating to the unsaturated polyester resins used in the laminate of the present invention are U.S. Pats. 2,255,313 and 2,443,735-41, inclusive. Representative patents showing unsaturated polyester resins in which promoters are used are illustrated by U.S. Pats. 2,818,400; 2,822,343 and 2,830,966. Illustrative of U.S. patents showing water-extended polyester resins are U.S. Pat. 2,443,735, referred to hereinabove, as well as U.S. Pat. 2,505,353 and the U.S. Pat. 3,256,219. Illustrative of patents showing the manufacture of poly(methyl methacrylate), especially by a continuous casting process or U.S. Pats. 2,500,728 and U.S. 3,376,371. Typical ethylene copolymer rubber-methyl methacrylate resin compositions are shown in Canadian Pat. No. 697,734, British Pat. 963,372 and U.S. Pat. No. 3,287,444. Illustrative of patents showing laminated articles in which reinforced polyester resins are deposited on a thermoformed thermoplastic sheet are British Pat. 904,763 and U.S. Pat. 3,356,253. All of these patents are hereby incorporated herein by reference.

SUMMARY OF THE INVENTION

This invention relates to a process for producing a weatherable laminated article comprising coating a thermoformable or thermoformed, comparatively rigid thermoplastic sheet composed of an ethylene copolymeric rubber-methyl methacrylate polymer composition with at least one layer of fiberglass reinforced, unsaturated polyester composition containing a polymerizable compound having a polymerizable $CH_2{=}C{<}$ group, preferably in the presence of a polymerization catalyst and permitting the resin to cure to the thermoset state on said sheet. This invention also relates to weatherable, rigidized structures produced by the process set forth hereinabove.

DESCRIPTION OF THE INVENTION INCLUDING PREFERRED EMBODIMENTS

In the preparation of the unsaturated polyester resin compositions used in the production of the structures of the present invention, one may make use of the alpha, beta unsaturated polycarboxylic acids such as maleic, fumaric, aconitic, itaconic, monochloro maleic anhydride and the like. These unsaturated acids should be present in an amount approximating at least 15%, by weight, based on the total weight of the polycarboxylic acids used and preferably in amounts varying between about 20% and 65%, by weight, based on the total weight of polycarboxylic acid present. If it is desired to make use of saturated polycarboxylic acids, that is, those which are free of non-benzenoid unsaturation, one may use such acids as phthalic malonic, succinic, glutaric, sebacic, and chlorinated polycarboxylic acids such as tetrachlorophthalic anhydride, hexachloroendomethylene tetrahydrophthalic acid and the like but in amounts less than about 85%, by weight, based on the total amount of polycarboxylic acid present. Whenever available, the anhydrides of these acids may be used or mixtures of the acids or mixtures of the anhydrides thereof.

As polyhydric alcohols which may be used to prepare the unsaturated polyesters used in the present invention, it is preferred to make use of those alcohols having only two hydroxy groups, although minor amounts of alcohols having three hydroxy groups, four hydroxy groups or more hydroxy groups may be used in minor amounts. As dihydroxy alcohols, one may use ethylene glycol, diethylene glycol, propylene glycol, dipropylene glycol, butanediol-1,4, butanediol-1,3, butanediol-1,2, pentanediol-1,2, pentanediol-1,3, pentanediol-1,4, pentanediol-1,5, hexanediol-1,6 and the like. Additionally, one may use glycerol, pentaerythritol, dipentaerythritol and the like.

The modifier for the polyester resin is a polymerizable material having a $CH_2{=}C{<}$ group. Amongst these polymerizable compounds are styrene, side chain-substituted styrenes such as alpha-methylstyrene, alpha-ethylstyrene and the like or ring-substituted styrenes such as ortho, meta and para alkyl styrenes such as o-methylstyrene, p-ethylstyrene, metapropylstyrene, 2,4-dimethylstyrene, 2,5-diethylstyrene and the like. Acrylates and methacrylates such as ethyl acrylate, methyl methacrylate etc. may also be used. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexaallyl disiloxane and the like.

In the preparation of the unsaturated polyester resins used in the present invention, it is unnecessary to use a catalytic material as the acids and the dihydric alcohols will readily react at elevated temperatures to produce the polyester resin. When the unsaturated polyester resin is combined with the polymerizable monomeric material, however, it is desirable to incorporate therein a polymerization inhibitor in order to prevent premature gelation of the resinons composition, particularly if it is expected that said composition will be subjected to prolonged periods of storage or if it is expected that it will be subjected to temperatures significantly higher than room temperature. With the polymerization inhibitor, the resinous composition will remain stable at room temperature for months without noticeable deterioration. Amongst the polymerization inhibitors which may be used are any of those which are conventionally known and used in the art such as hydroquinone, toluhydroquinone, benzaldehyde, ascorbic acid, isoascorbic acid, resorcinol, tannin, symmetrical di - (beta - naphthyl) - p - phenylene diamine, phenolic resins, sulfur compounds and the like. The concentration of the inhibitor is preferably low and as a general rule less than 1%, by weight, based on the weight of the polyester, is usually sufficient. However, with the preferred inhibitors, e.g., polyhydric phenols and aromatic amines, one may make use of such small amounts as 0.01%–0.1%, by weight, same basis.

The polyester resins can readily be solidified without benefit of catalyst by the application of heat or by the application of heat and pressure over a long period of time. However, the time element makes it desirable to incorporate into the composition conventional polymerization catalysts such as the organic superoxides, the alcoholic and acidic peroxides in order to cause a more rapid curing. Among the preferred catalysts are: the acidic peroxides, e.g., benzoyl peroxide, phthalic peroxide, succinic peroxide and benzoyl acetic peroxide; fatty oil acid peroxides, e.g., coconut oil acid peroxide, lauric peroxide, stearic peroxide and oleic peroxide; alcohol peroxides, e.g., tertiary-butyl hydroperoxide, usually called tertiary-butyl peroxide and terpene oxides, e.g., ascaridole. Still other polymerization catalysts might be used in some instances, e.g., methyl ethyl ketone peroxide and other ketone peroxides and hydroperoxides such as hydrogen peroxide and cumene hydroperoxide and di-tertiary-butyl peroxide. Amounts of catalysts ranging from about 0.01% to about 5.0%, by weight, based on the weight of the polyester, may be used.

It is also beneficial to use a promoter in combination with the catalytic agent in order to further accelerate the cure of the polymerizable polyester resin composition to a thermoset state. Among the promoters which may be utilized are the cobalt salts such as cobalt naphthenate or those disclosed in the U.S. Pats. 2,466,800 and 2,480,928 also hereby incorporated herein by reference. Particularly advantageous are the mercaptans such as n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetradecyl mercaptan, n-hexadecyl mercaptan, secondary hexyl mercaptan, tertiary hexyl mercaptan, tertiary octyl mercaptan, and the like. The dialkyl substituted anilines are additionally useful as promoters, particularly dimethyl aniline, diethyl aniline, dipropyl aniline, dibutyl aniline and the like. Obviously, these promoters can be used either singly or in combination with one another. Usually, these catalyst promoters are used by those skilled in the art in very small quantities such as from about 0.005% to about 0.4%, by weight, of the catalyst promoter, based on the total weight of the polyester resin. This amount is generally sufficient to obtain the desired curing cycle. The promoter may be introduced into the resinous composition at any time prior to the cure thereof.

When using water-extended polyester resins, the bonding of the resin onto the ethylene rubber copolymer-methyl methacrylate composition according to my invention, is enhanced by the use of a neat polyester prime coat, said neat polyester containing a polymerizable compound having a $CH_2=C<$ group, a polymerization promoter and a polymerization catalyst. The promoter content of the neat polyester prime coat and/or the polyester resin used to make the rigidizing portion of the laminates of the present invention will, however, have a significantly larger quantity of promoter present, i.e. at least 0.4%, by weight, based on the total weight of the polyester resin, with a range of between about 0.4% and 1.5%, by weight, same basis, being exemplary, and a range of between about 1.0% and 1.25%, by weight, same basis, being preferred. It is theorized that these promoters in these large amounts not only function as catalyst promoters but also function as surfactants for the water-extended polyester resins. If desired, an additional surfactant that is a non-promoter could also be used.

The unsaturated polyester resin which may be used as the prime coating is used as a neat resin, i.e. it contains no solvent other than the polymerizable monomer which functions as a reactive solvent and, of course, becomes a part of the total resin molecule when it is converted from the thermosetting to the thermoset state. The prime coat does not have to be the same polyester resin as is used as the water-extendable polyester resin although it is preferred that the prime coat be of the same class that is used to make the water-extendable resin.

The thermoformable or thermoformed comparatively rigid thermoplastic sheet which is used to make the laminates of the present invention may be a cast sheet or an extruded sheet of an ethylene copolymer-methyl methacrylate resin composition.

The ethylene copolymers used are generally well known in the art and their properties and methods for their preparation are more fully discussed in U.S. Pat. No. 3,218,373, which patent is hereby incorporated herein by reference. The ethylene copolymer rubber may be cross-linked or non-cross-linked. If a cross-linked ethylene copolymer rubber is used, it may be cross-linked by contacting the ethylene copolymer rubber with a peroxide catalyst and heating, by radiation or any other known method such as chemical reaction or other methods discussed in said U.S. patent. The rubbery copolymers comprise (I) from about 50% to about 95% of ethylene, (II) from about 5% to about 50% of vinyl acetate, an alkyl acrylate or methacrylate, said alkyl group containing from about 1–18 carbon atoms, inclusive, acrylic acid, methacrylic acid, or mixtures of two or more of said monomers and may also contain (III) up to 20%, by weight, based on the total weight of the final ethylene polymer, i.e. that comprising (I), (II) and (III), of any of the copolymerizable monomers set forth hereinbelow in regard to the comonomers useful in the production of the methyl methacrylate polymer component thereof. The ethylene copolymer rubber should be present in the compositions in amounts ranging from about 1.0% to about 75%, by weight, preferably from about 10% to about 50%, by weight, based on the total weight of the final compositions. It is preferred that the ethylene copolymer used be grafted, the grafting being accomplished during interpolymerization with the monomers making up the methyl methacrylate polymer as mentioned more fully hereinbelow.

The methyl methacrylate resinous polymer phase of the compositions may be comprised of (A) from about 50% to about 100% of methyl methacrylate and, correspondingly, (B) from about 0% to about 50% of vinyl acetate or an alkyl acrylate of up to 18 carbon atoms, inclusive, in the alkyl group thereof. Mixtures of vinyl acetate and an alkyl acrylate may also be used in the copolymer phase in the above concentrations. The methyl methacrylate copolymer, i.e. that containing vinyl acetate and/or alkyl acrylate, may also contain, in addition thereto, (C) up to 20%, by weight, based on the total weight of the polymer, that comprising (A), (B) and (C), of a copolymerizable monomer such as the allyl, methallyl, crotyl, 1-chloroallyl, 2-chloroallyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, malonic, succinic, glutaric, adipic, pimelic, suberic, azelaic, maleic, fumaric, citraconic, mesaconic, itaconic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative of which appear above; acrylic acid, methcrylic acid; vinyl cyclic compounds (including monovinyl aromatic hydrocarbons) e.g., styrene, o-, m-, and p-chlorostyrenes, -bromostyrenes, -fluorostyrenes, -methylstyrenes, -ethylstyrenes, -cyanostyrenes, the various polysubstituted styrenes such, for example, as the various di-, tri-, and tetra-chlorostyrenes, -boromostyrenes, -fluorostyrenes, -methylstyrenes, -ethylstyrenes, -cyanostyrenes, etc., vinyl naphthalene, divinyl benzene, trivinyl benzene, allyl benzene, diallyl benzene, the various allyl cyanostyrenes, the various alpha-substituted styrenes and alpha-substituted, ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, acrylamide and N-substituted acrylamides, e.g., N-methylol acrylamide, N-allyl acrylamide, N-methyl acrylamide, N-phenyl acrylamide, etc.; unsaturated ketones e.g. methyl vinyl ketone, methyl allyl ketone, etc.; unsaturated polyhydric alcohol (e.g. butenediol, etc.) esters of saturated and unsaturated, aliphatic and aromatic, monobasic and polybasic acids, and the like.

Other examples of monomers that can be interpolymerized with the methyl methacrylate, vinyl acetate and/or alkyl acrylate are the vinyl halides, more particularly vinyl chloride, vinyl bromide and vinyl iodide, and the various vinylidene compounds, including the vinylidene bromide, vinylidene fluoride and vinylidene iodide.

Among other comonomers which may be used by interpolymerizing them with the mehtyl methacrylate, vinyl acetate and/or alkyl acrylate are, for example, compounds such as acrylonitrile, and other compounds, e.g., the various substituted acrylonitriles (e.g. methacrylonitrile, ethacrylonitrile, phenylacrylonitrile, etc.) the various N-substituted acrylamides and alkacrylamides, for instance, N-dialkyl acrylamides and methacrylamides, e.g. N-dimethyl, -diethyl, -dipropyl, -dibutyl, etc., acrylamides and methacrylamides, also other acrylates and methacrylates such as methyl acrylate, n-hexyl acrylate, t-butyl methacrylate, stearyl methacrylate and the like.

The resinous, polymeric methyl methacrylate phase should be present in the compositions from which the thermoplastic sheet is prepared in amounts ranging from about 25% to about 99%, by weight, preferably 50% to about 90%, by weight based on the total weight of the composition.

If the thermoplastic sheet is to be thermoformed, it may be so converted by using a method such as that set forth in the U.S. Pat. 2,917,783 or other conventional processes. It is then coated with the fiberglass containing polyester either with or without the neat polyester prime coat. If it is desired to make a straight flat panel, the thermoplastic ethylene rubber-methyl methacrylate resin sheet, hereinafter sometimes called "ERMA sheet," is not thermoformed before the application of the fiberglass containing coating of the unsaturated polyester resin composition or the prime coat, but only the use of a comparatively thin sheet of the thermoplastic material, such as those produced by extrusion of the thermoplastic material through an aperture having a measurement or thickness of about 5–50 mils and preferably one having an opening of about 20–30 mils, is required. The ultimate weatherable rigidized laminate produced from such a thin film of ERMA sheet may be utilized as a wall panel and pigments and other coloring materials may be incorporated into the sheet so as to impart the desired color thereto.

If the thermoformable, comparatively rigid ERMA sheet is to be thermoformed, it is preferably thermoformed before the prime coating and/or fiberglass filled polyester resin coating is applied thereto. In such a case, the ERMA sheet should have a thickness, before the thermoforming operation is begun, varying between about .040 inch to about 3/16 inch. After the thermoforming operation has been completed, the thermoformed ERMA sheet should have a thickness of about 5–50 mils and, preferably, between about 20–30 mils, as in the type of sheet used for the nonthermoformed laminate. It is possible, however, to thermoform the ERMA sheet after having coated it with the polyester coating by use of a "male plug" whereby the coated polyester is thermoset while the thermoforming of the ERMA sheet configuration is being effected. The thermoformed laminates of the present invention may be used for boat hulls, such as sail boat hulls or power boat hulls. They may also be used as the body of a sand dune buggy or as a kitchen sink with one or two wells or as a camper top or as a bath tub or modular shower stall or shower stall-tub combination.

The following examples are set forth for purposes of illustration only and are not to be construed as limitations on the instant invention except as set forth in the appended claims. All parts and percentages are by weight unless otherwise specified.

RESIN A

A polyester resin is prepared by coreacting 3.91 mols of phthalic anhydride, 2.09 mols of maleic anhydride, 5.47 mols of propylene glycol and 0.79 mol of diethylene glycol to an acid number of about 31–37. To 55 parts by weight of the resulting polyester there are added 3 parts of dimethyl formamide, 42 parts by weight of monomeric styrene, 0.013 part of hydroquinone, 0.01 part of toluhydroquinone, 0.0012 part of a commercially available solution of copper naphthenate containing about 8% copper, 0.6 part of a commercially available thixotropic agent, 0.25 part of a commercially available solution of cobalt octoate containing about 12% cobalt, 0.04 part of dimethyl aniline and 0.04 part of diethyl aniline.

RESIN B

A polyester resin is prepared by coreacting 3.00 mols of phthalic anhydride, 3.00 mols of maleic anhydride and 6.30 mols of propylene gylcol to an acid number of about 40–45. To 55 parts by weight of the resulting polyester there are added 3 parts of dimethyl formamide, 42 parts of monomeric styrene, 0.013 part of hydroquinone, 0.6 part of thixotropic agent, 0.25 part of a commercially available solution of cobalt octoate containing about 12% cobalt, 0.03 part of dimethyl aniline and 0.02 part of diethyl aniline.

RESIN C

Resin C is a commercially available water-extendable polyester resin containing the esterification reaction product of isophthalic acid, maleic anhydride, propylene glycol and ethylene glycol, cut with monomeric styrene.

Example 1

A 0.040" thick, white pigmented ERMA sheet* is coated on one face with a ply of 1½ oz. fiberglass mat and the mat is saturated with polyester Resin A catalyzed with 0.5% of methyl ethyl ketone peroxide, by weight, based on the resin content, before application to the glass mat. Two additional plies of glass mat are applied and each is saturated with the catalyzed Resin A. The resultant ---
*The ERMA sheet is composed of 15% of a lightly cross-linked copolymer of ethylene and vinyl acetate (75/25) and 85% of a methyl methacrylate-ethyl acrylate (90/10) copolymer produced by interpolymerizing the methyl methacrylate and ethyl acrylate in the presence of the crosslinked ethylene copolymer under known conditions.

structure is cured at ambient room temperature for 24 hours.

After 4000 hours in an accelerated weathering test, FVW, this sample is shown to be superior to a commercially available, glass fiber reinforced arcrylic polymer sheet containing polybutadiene rubber.

|  | Sheet of Example 1 | Commercially available polybutadiene based sheet |
|---|---|---|
| Yellowness Index: | | |
| 0 | 1.8 | −4.9 |
| 4000 hours | 4.8 | 27.2 |
| Whiteness Index: | | |
| 0 | 78 | 86 |
| 4000 hours | 71 | 5 |
| Gardner impact, in.-lb./100 mil: | | |
| 0 | 75 | 100 |
| 4000 hours | 38 | 30 |

Example 2

Example 1 is repeated in all essential details except that Resin B is catalyzed with 0.5% methyl ethyl ketone peroxide. After 8000 hours in FVW accelerated weathering, the yellowness index of the resultant reinforced sheet increases from 5.6 to 7.1.

Example 3

A 0.040" thick, white pigmented ERMA sheet is coated on one face with a ply of 1½ oz. fiberglass mat and the mat is saturated with a water-resin emulsion formed from polyester Resin C and an equal weight of water, the emulsion having been catalyzed with 0.5% of methyl ethyl ketone peroxide, by weight, based on the resin content before application to the glass mat. Two additional plies of glass mat are applied and each is saturated with the catalyzed water-resin emulsion. The resultant coated sheet is cured at ambient room temperature for 24 hours. The peel strength of the laminate, based on ASTM D-1781-62 climbing drum peel test is 0.4 in.-lb./in. torque. The weathering properties are essentially the same as the sheet of Example 1.

Example 4

Example 3 is repeated in all essential details except that unsaturated Resin C used neat and catalyzed with 1% benzoyl peroxide is used as a prime coat on the ERMA sheet before the water-extended Resin C-glass mat combinations are applied. The climbing drum peel strength of this laminate is 13.5 in-lb./in. torque.

Example 5

A composite structure is prepared as in Example 1 using a water-resin emulsion consisting of 77 parts of Resin C, 7.7 parts of methyl methacrylate, 15.3 parts of glass beads, 100 parts of water and 0.5 part of methyl ethyl ketone peroxide. The climbing drum peel strength of this laminate was 0.5 in.-lb./in. torque.

Example 6

The procedure of Example 1 is again followed except that the ERMA sheet is produced from an ethylene/ethyl acrylate (72/28) rubber which is not cross-linked. Similar results are achieved. The ERMA was, prior to coating, thermoformed into the shape of a bath tub.

Example 7

A cross-linked rubbery copolymer of ethylene and stearyl methacrylate (95/5) and a terpolymer of methyl methacrylate, vinyl acetate and acrylic acid (90/5/5) are substituted for the ethylene rubber and methyl methacrylate copolymer, respectively, of Example 1. When a reinforced sheet is prepared according to said example, excellent results are achieved.

Example 8

The procedure of Example 1 is again followed except that the rubbery copolymer is produced from ethylene and methyl acrylate (50/50) and the polymer resin is produced from methyl methacrylate, ethyl acrylate and vinyl acetate (50/40/10). Excellent results are achieved.

Following the procedure of Example 7 various other ethylene rubbers and methyl methacrylate polymers are substituted for the materials used therein. In each instance, a tough, high impact rigidified thermoformed sheet is recovered. The sheet was previously thermoformed into the shape of a boat hull. The rubbers and polymers used are set forth in Table I, below.

TABLE I

| Example | Ethylene polymer | Methyl methacrylate polymer |
|---|---|---|
| 9 | Cross-linked copolymer of ethylene and methacrylic acid (85/15). | Methyl methacrylate, vinyl acetate, acrylonitrile (85/10/5) terpolymer. |
| 10 | Copolymer of ethylene and lauryl methacrylate (80/20). | Methyl methacrylate, methyl acrylate, stearyl methacrylate (90/8/2) terpolymer. |
| 11 | Copolymer of ethylene and butyl acrylate (75/25). | Methyl methacrylate, ethyl acrylate, acrylic acid (90/5/5) terpolymer. |
| 12 | Cross-linked copolymer of ethylene and stearyl acrylate (75/25). | Methyl methacrylate, vinyl acetate, α-methyl styrene (90/5/5) terpolymer. |
| 13 | Terpolymer of ethylene, vinyl acetate and acrylic acid (75/20/5). | Methyl methacrylate, lauryl methacrylate, acrylic acid (80/15/5) terpolymer. |
| 14 | Cross-linked terpolymer of ethylene, vinyl acetate and acrylonitrile (80/10/10). | Same as Example 1. |
| 15 | Terpolymer of ethylene, ethyl acrylate and vinylidene chloride (70/20/10). | Same as Example 7. |

I claim:

1. A laminate comprising a thermoformed comparatively rigid thermoplastic sheet having deposited on one side thereof at least one layer of a fiberglass reinforced, unsaturated polyester resin composition containing a polymerizable compound having a polymerizable $CH_2=C<$ group, said sheet being comprised of (1) from about 1.0% to about 75%, by weight, of a grafted copolymer of (I) from about 50% to about 95% of ethylene, (II) from about 5% to about 50% of vinyl acetate, an alkyl acrylate or methacrylate, said alkyl group containing from about 1-18 carbon atoms, inclusive, acrylic acid, methacrylic acid or mixtures of two or more of said monomers and (III) up to 20%, by weight, based on the total weight of (I), (II) and (III) of another monomer copolymerizable with (I) and (2) from about 25% to about 99%, by weight, of a polymer of (a) at least 50%, by weight, of methyl methacrylate, (b) up to 50%, by weight, of a comonomer selected from the group consisting of vinyl acetate and an alkyl acrylate and (c) up to 20%, by weight, based on the total weight of (a), (b) and (c) of another monomer copolymerizable with said (a).

2. A laminate according to claim 1 wherein the polyester resin is a water-extended unsaturated resin composition containing a polymerizable compound having a polymerizable $CH_2=C<$ group.

3. A laminate according to claim 2 wherein a prime coating of a neat unsaturated polyester resin composition containing a polymerizable compound having a polymerizable $CH_2=C<$ group is affixed to said sheet, said water-extended polyester resin being deposited thereon.

4. A laminate according to claim 1 wherein said (1) is a copolymer of ethylene and vinyl acetate.

5. A laminate according to claim 1 wherein said (2) is a copolymer of methyl methacrylate and ethyl acrylate.

6. A laminate according to claim 1 wherein said (1) is cross-linked.

7. A laminate according to claim 2 wherein said (1) is cross-linked.

8. A method for the production of a laminate according to claim 2 which comprises depositing onto said comparatively rigid thermoplastic sheet at least one layer of a fiberglass reinforced, water-extended unsaturated polyester resin composition containing a polymerizable compound having a $CH_2=C<$ group, at least 0.4% of a polymerization promoter and a polymerization catalyst and permitting the polyester resin to cure to the thermoset state on said sheet.

9. A method according to claim 8 wherein said sheet is coated with a neat unsaturated polyester resin composition containing a polymerizable monomer having a $CH_2=C<$ group, at least 0.4% of a polymerization promoter and a polymerization catalyst before said water-extended polyester resin composition is deposited thereon.

10. A method according to claim 9 wherein the sheet is thermoformed before the polyester resin is deposited or coated thereon.

References Cited
UNITED STATES PATENTS

| | | | |
|---|---|---|---|
| 2,443,737 | 6/1948 | Kropa | 156—332 |
| 3,661,696 | 5/1972 | Knutson | 156—332 |

WILLIAM A. POWELL, Primary Examiner

J. J. BELL, Assistant Examiner

U.S. Cl. X.R.

156—332; 161—203; 260—876 R, 878 R